US009070345B2

(12) United States Patent
Kritt et al.

(10) Patent No.: US 9,070,345 B2
(45) Date of Patent: *Jun. 30, 2015

(54) INTEGRATING STREET VIEW WITH LIVE VIDEO DATA

(71) Applicant: International Business Machines Corporation, Armonk, NY (US)

(72) Inventors: Barry A. Kritt, Raleigh, NC (US); Sarbajit K. Rakshit, Kolkata (IN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 106 days.

This patent is subject to a terminal disclaimer.

(21) Appl. No.: 14/024,252

(22) Filed: Sep. 11, 2013

(65) Prior Publication Data

US 2014/0347477 A1 Nov. 27, 2014

Related U.S. Application Data

(63) Continuation of application No. 13/902,281, filed on May 24, 2013.

(51) Int. Cl.
*H04N 7/18* (2006.01)
*G09G 5/377* (2006.01)
*H04N 5/265* (2006.01)
*H04N 5/272* (2006.01)

(52) U.S. Cl.
CPC ............... *G09G 5/377* (2013.01); *H04N 5/265* (2013.01); *H04N 5/272* (2013.01)

(58) Field of Classification Search
None
See application file for complete search history.

(56) References Cited

U.S. PATENT DOCUMENTS

| 8,046,330 | B2 | 10/2011 | Ozaki et al. | |
|---|---|---|---|---|
| 8,358,903 | B1 | 1/2013 | Meads et al. | |
| 2006/0242679 | A1* | 10/2006 | Hutchison et al. | 725/105 |
| 2008/0177764 | A1* | 7/2008 | Kise et al. | 707/100 |
| 2010/0223577 | A1* | 9/2010 | Bennett et al. | 715/800 |
| 2011/0134256 | A1 | 6/2011 | Moribe et al. | |
| 2011/0261203 | A1 | 10/2011 | Mupkala et al. | |
| 2012/0162253 | A1* | 6/2012 | Collins | 345/629 |
| 2012/0176491 | A1 | 7/2012 | Garin et al. | |
| 2013/0329050 | A1* | 12/2013 | Pham et al. | 348/159 |

FOREIGN PATENT DOCUMENTS

WO 2011018981 A1 2/2011

OTHER PUBLICATIONS

Young, "How to merge Google street view with your own images," Helium, Inc. Jul. 4, 2010, 2 pages.

* cited by examiner

*Primary Examiner* — Amara Abdi
(74) *Attorney, Agent, or Firm* — VanLeeuwen & VanLeeuwen; Katherine Brown

(57) ABSTRACT

An approach is provided in which a system retrieves a street view image that depicts a geographical area viewed from a street view perspective. The system identifies a video device depicted in the street view image that provides a live video stream of a real-time viewable area corresponding to at least a portion of the depicted geographical area. In turn, the system generates a composite image that combines the street view image with a viewing area overlay corresponding to the real-time viewable area.

7 Claims, 10 Drawing Sheets

INTEGRATING STREET VIEW WITH LIVE VIDEO DATA

BACKGROUND

The present disclosure relates to integrating street view images with live video data. More particularly, the present disclosure relates to combining street view images with viewing area overlays that indicate real-time viewable areas provided by live video devices.

Mapping technologies include street view images that provide a user with the ability to view a geographical location from a "street view" perspective. The street view images may be taken by, for example, a vehicle-mounted camera that captures images as the vehicle drives along a street. Since the street view images are captured at particular points in time (e.g., once every year), the street view images depict a historical representation of geographical areas. For example, street view images may capture Time Square on an early Sunday morning, which may not accurately represent Time Square during a New Year's Eve celebration.

BRIEF SUMMARY

According to one embodiment of the present disclosure, an approach is provided in which a system retrieves a street view image that depicts a geographical area viewed from a street view perspective. The system identifies a video device depicted in the street view image that provides a live video stream of a real-time viewable area corresponding to at least a portion of the depicted geographical area. In turn, the system generates a composite image that combines the street view image with a viewing area overlay corresponding to the real-time viewable area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
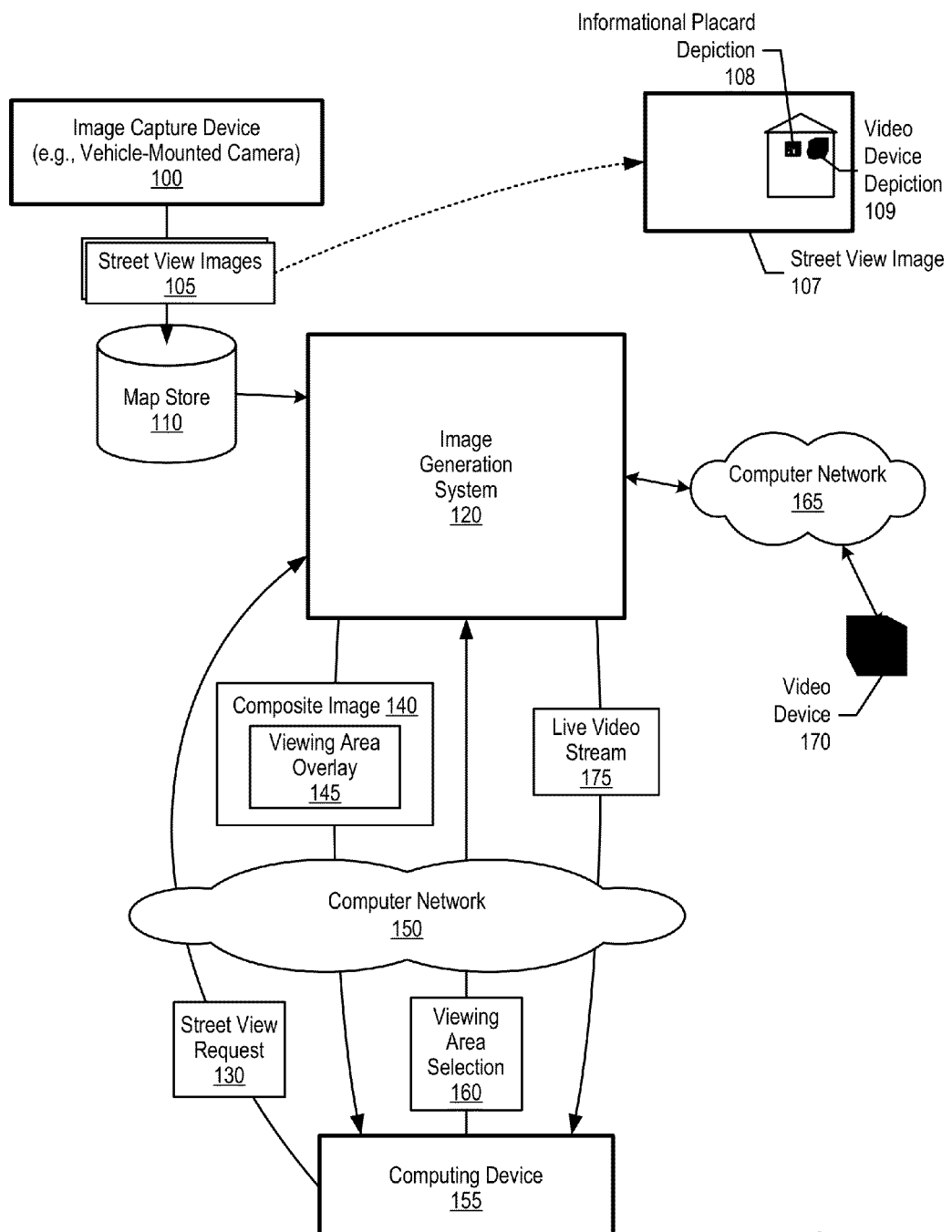
FIG. 1 is a diagram showing an image generation system generating composite images that include viewing area overlays and providing live video data in response to receiving a selection of one of the viewing area overlays.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing an image generation system generating composite images that include viewing area overlays and providing live video data in response to receiving a selection of one of the viewing area overlays. This disclosure provides an approach in which viewing area overlays are combined with street view images to indicate real-time viewable areas of the street view image's depicted geographical area. When a user selects a viewing area overlay, a corresponding live video stream is provided to the user.

Image capture device 100 captures street view images 105, which are stored in map store 110. For example, a vehicle-mounted camera may capture still images as the vehicle travels on a street. Each of street view images 105 are captured from a street view perspective (e.g., ground level) and include a "geographical location" component (e.g., latitude and longitude, an address, etc.) and a "street view orientation" component (e.g., facing East, West, 245 degrees, etc.). FIG. 1 shows street view image 107 (one of street view images 105), which includes informational placard depiction 108 (e.g., a Quick Response (QR) code placard) and video device depiction 109 mounted on a building.

Image generation system 120 receives street view request 130 from computing device 155. Street view request 130 includes a geographical location and a street view orientation. Image generation system 120 retrieves a street view image (e.g., street view image 107) corresponding to the geographical location and street view orientation from map store 110, and determines whether an informational placard is depicted on the retrieved street view image.

Figure 2:
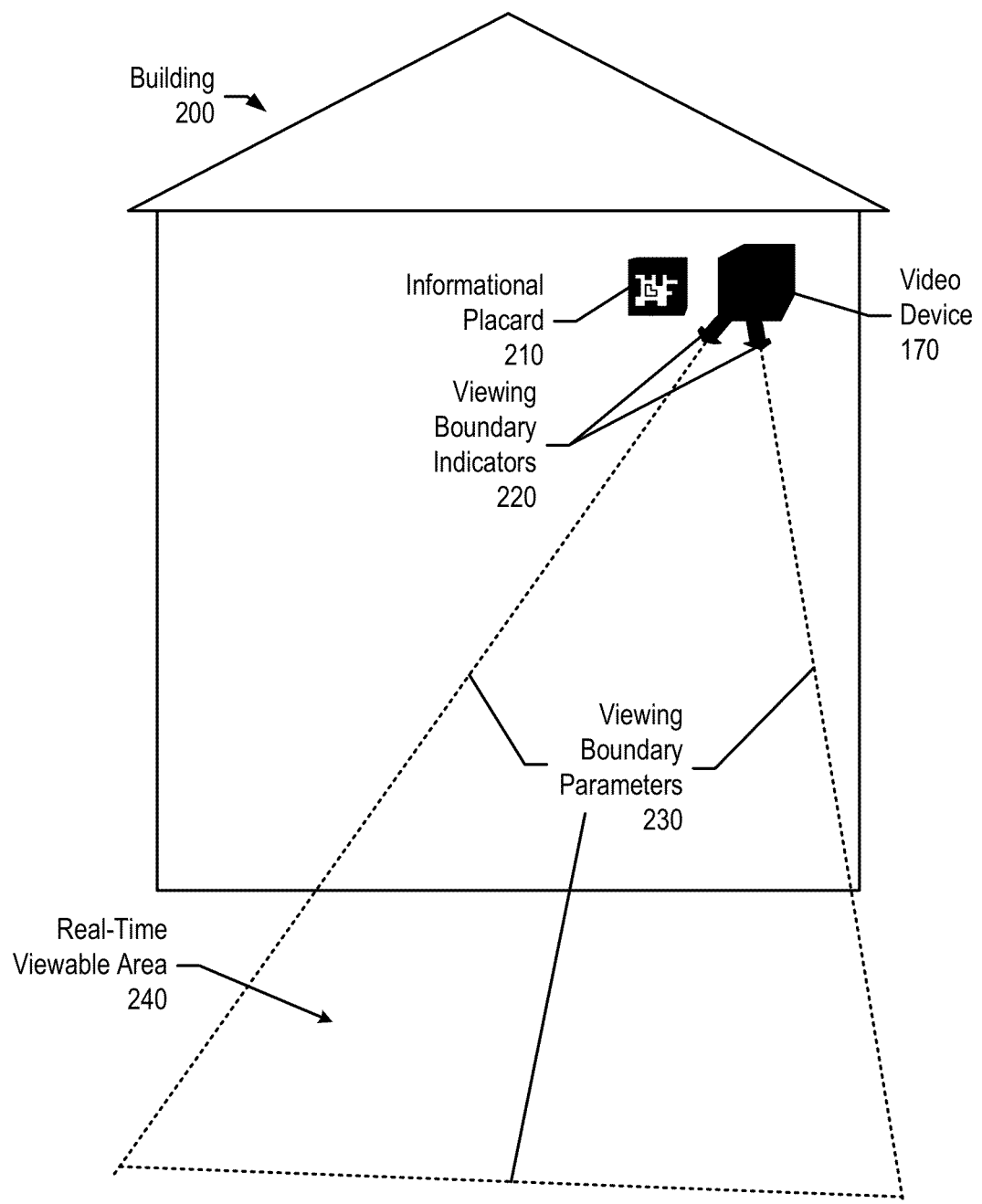
FIG. 2 depicts an information placard and corresponding video device mounted on a building.

When image generation system 120 detects an informational placard, image generation system 120 identifies a real-time viewable area of a corresponding video device, and generates a viewing area overlay based upon the real-time viewable area (see FIG. 2 and corresponding text for further details). In turn, image generation system 120 combines viewing area overlay with the street view image to create composite image 140, which is provided to computing device 155 through computer network 150.

A user views composite image 140 on computing device 155 and selects the viewing area overlay. In turn, computing device 155 sends viewing area selection 160 to image generation system 120. Image generation system 120 identifies the video device corresponding to the viewing area selection, and establishes a network connection with the actual video device (video device 170) via computer network 165. In turn, image generation system 120 receives a live video stream from video device 170 and provides live video stream 175 to computing device 155 accordingly. As a result, the user may view a real-time, live video stream of the real-time viewable area.

In one embodiment, other types of real-time sensory information may be available, such as audio from an audio device and/or environmental data from an environmental device (e.g., rain gauge, thermometer, etc.) in proximity to the geographical area. In this embodiment, image generation system 120 identifies informational placards in the street view images and generates sensory overlays accordingly (e.g., audio overlays, environmental overlays, etc., see FIGS. 7-8 and corresponding text for further details).

FIG. 2 depicts an information placard and corresponding video device mounted on a building. In one embodiment, a vehicle mounted camera captures street view still images as the vehicle drives along a street. These captured images depict buildings, vehicles, pedestrians, etc. that are present at geographical locations during the time at which the image was captured. When an image captures an informational placard, such as informational placard 210 mounted on building 200, image generation system 120 performs processing steps to identify a corresponding video device (video device 170) and generate a viewing area overlay based upon the video device's viewing boundaries (viewing angles).

FIG. 2 shows an embodiment where viewing boundary indicators 220 are mounted in proximity to video device 170 and oriented in directions to indicate video device 170's viewing boundary. As such, image generation system 120 extrapolates viewing boundary indicators 220 to generate viewing boundary parameters 230. In turn, image generation system 120 uses viewing boundary parameters 230 to define video device 170's real-time viewable area 240 and generate a corresponding viewing area overlay (see FIG. 3 and corresponding text for further details).

Figure 5:
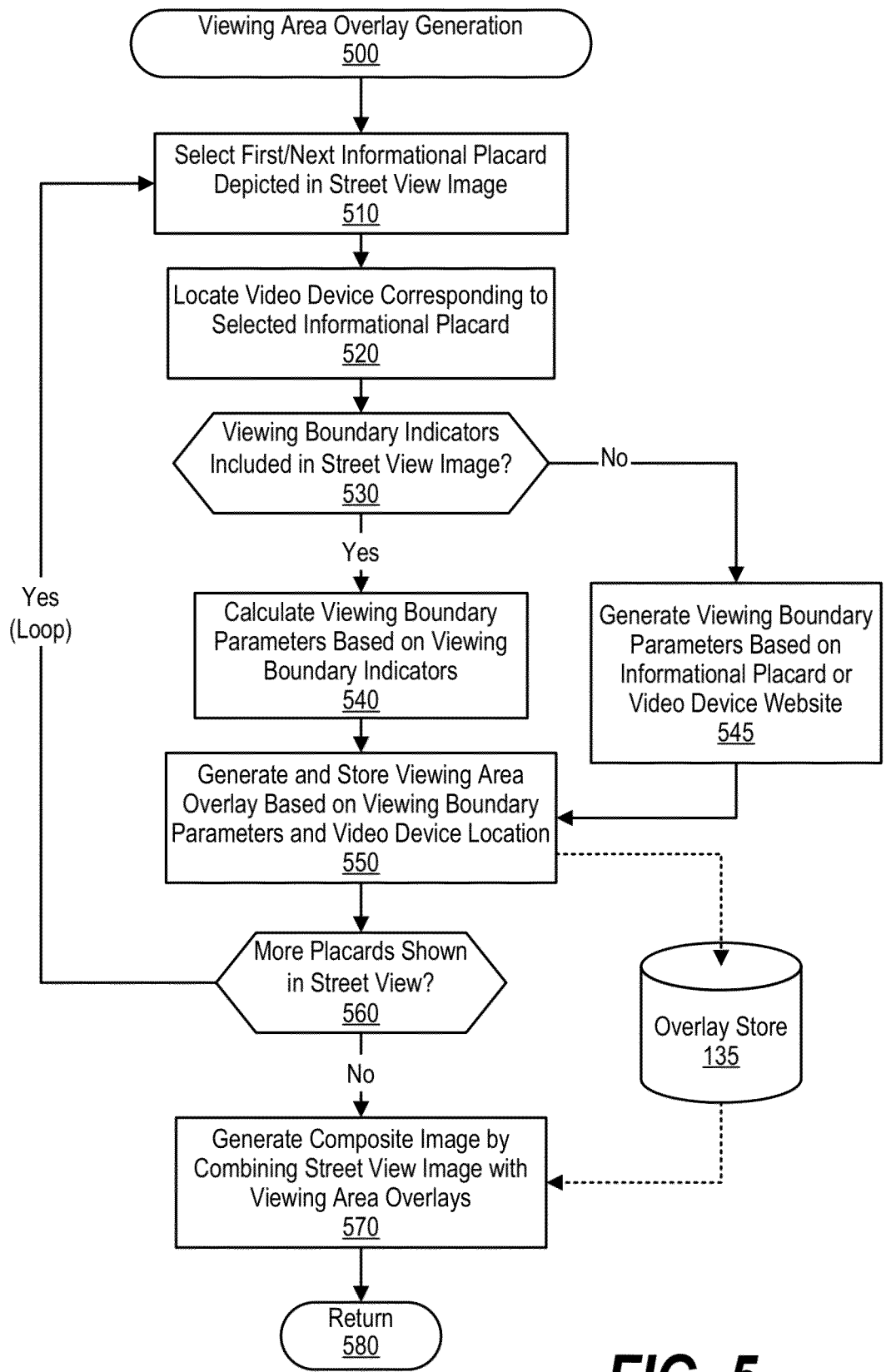
FIG. 5 is a flowchart showing steps taken in generating viewing area overlays.

In another embodiment, image generation system 120 generates viewing boundary parameters 230 based upon, for example, information included in informational placard 210 (see FIG. 5 and corresponding text for further details).

Figure 3:
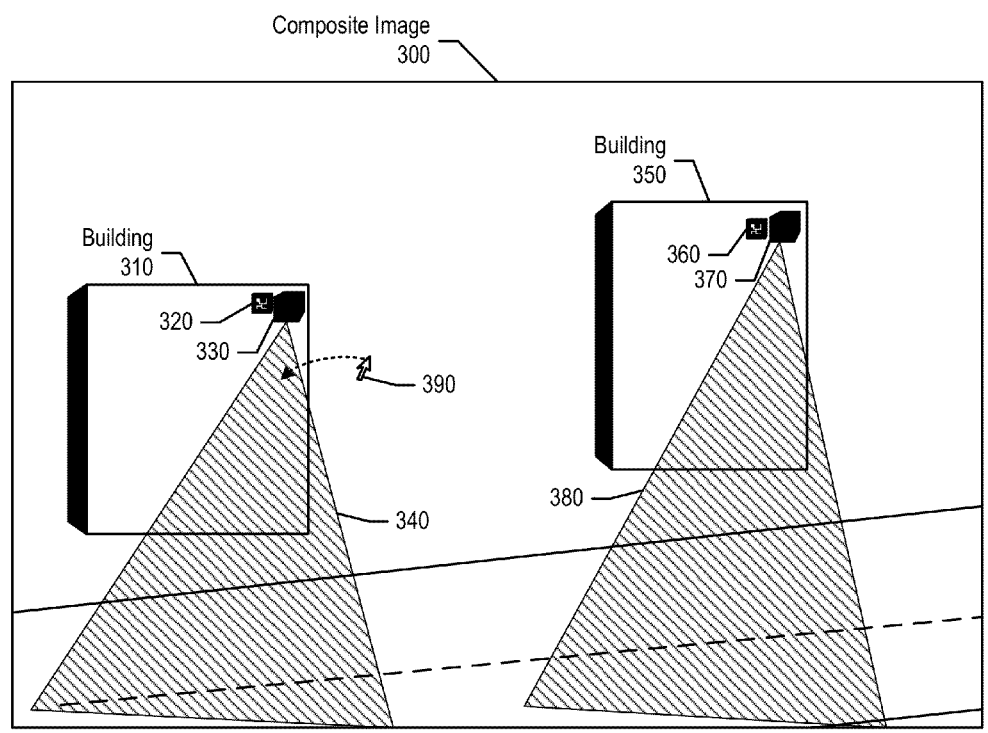
FIG. 3 depicts a composite image that combines viewing area overlays with a street view image.

FIG. 3 depicts a composite image that combines viewing area overlays with a street view image. Composite image 300 includes two informational placard depictions. Informational placard 320 is mounted on building 310 and informational placard 360 is mounted on building 350. When image generation system 120 detects the two informational placards, image generation system 120 proceeds through a series of steps to identify video devices 330 and 370 and, in turn, generate corresponding viewing area overlays 340 and 380.

As such, when a user views composite image 300, the user may select one of viewing area overlays 340 or 380 with pointer 390 (or via touch screen), which instructs image generation system 120 to provide a live video stream from the corresponding video camera.

Figure 4:
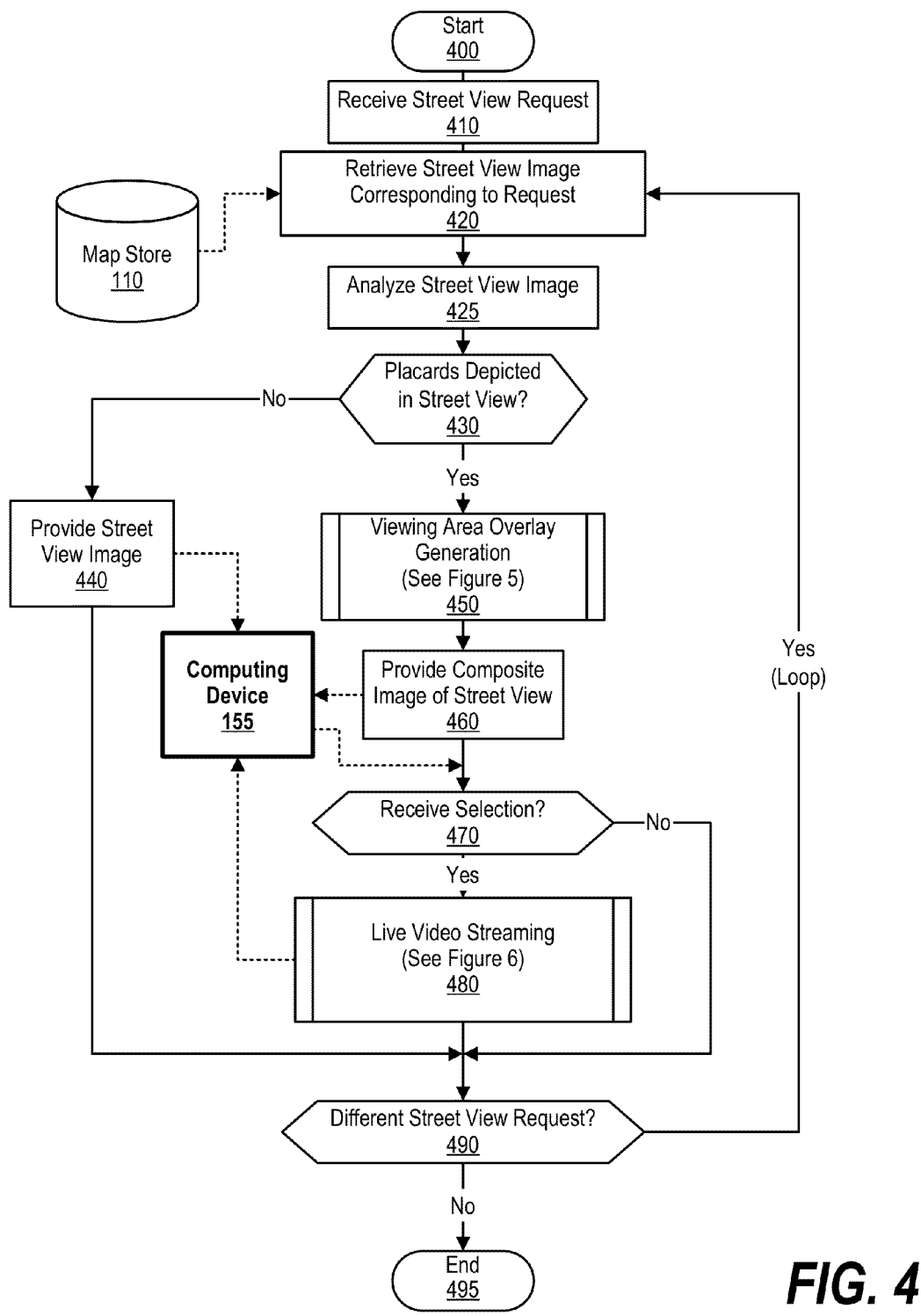
FIG. 4 is a high-level flowchart showing steps taken in generating composite images and providing a live video stream in response to receiving a viewing area selection from a computing device.

FIG. 4 is a high-level flowchart showing steps taken in generating composite images and providing a live video stream in response to receiving a viewing area selection from a computing device.

Processing commences at 400, whereupon processing receives a street view request from computing device 155, such as a desktop computer, a laptop computer, a cell phone, a tablet computer, or any other type of electronic device that accesses a computer network (step 410). The street view request indicates a geographical location (e.g., latitude and longitude, an address, etc.) and also includes a street view orientation (e.g., facing East, West, 245 degrees, etc.).

At step 420, the image generation system retrieves a street view image (still image) from map store 110 that corresponds to the geographical location and the street view orientation. For example, assuming the geographical location is 100 Main Street, Anytown, CO and the street view orientation is 90 degrees, the street view image that is retrieved was taken at 100 Main Street, Anytown, CO and facing 90 degrees (facing East).

At step 425, the image generation system analyzes the street view image to identify informational placards depicted in the street view image. For example, the street view image may include two informational placards on two different buildings that correspond to two different video devices, such as that shown in FIG. 3. In one embodiment, the street view image may include informational placards that correspond to other sensory devices, such as an audio device or environmental device (e.g., rain gauge, thermometer, etc., see FIGS. 7-8 and corresponding text for further details).

In yet another embodiment, the image generation system may access a database that stores informational placard locations (or sensory device locations). In this embodiment, the image generation system queries the database for informational placards in proximity to the geographical location.

A determination is made as to whether there are any informational placards depicted in the retrieved street view image (decision 430). If there are no depicted informational placards, decision 430 branches to the "No" branch, whereupon the image generation system provides the street view image (e.g., without overlays) to computing device 155 (step 440).

On the other hand, if the street view image includes one or more informational placards, decision 430 branches to the "Yes" branch, whereupon the image generation system creates overlays corresponding to the informational placards and generates a composite image that combines the viewing area overlays with the street view image (pre-defined process block 450, see FIG. 5 and corresponding text for further details).

At step 460, the image generation system provides the composite image to computing device 155 over a computer network, such as a wired network connection, a wireless network connection, or a combination of a wired network connection and a wireless network connection.

The image generation system determines whether computing device 155 provides a viewing area selection, such as whether a user selected a particular viewing area overlay (decision 470). If the image generation system receives a viewing area selection, decision 470 branches to the "Yes" branch, whereupon the image generation system accesses a video device corresponding to the selected viewing area selection and provides a live video stream to computing device 155 (pre-defined process block 480, see FIG. 6 and corresponding text for further details). On the other hand, if the image generation system does not receive a viewing area selection from computing device 155, decision 470 branches to the "No" branch, bypassing live video stream accessing steps.

A determination is made as to whether the image generation system receives a different street view request (decision 490). The different street view request may include a different geographical location (e.g., further down a street), or may correspond to the same geographical location but with a different street view orientation (e.g., a different view to the "left" or "right" of the current street view image). If the image generation system receives a different street view request, decision 490 branches to the "Yes" branch, which loops back to process the different street view request. This looping continues until image generation system processing should terminate (e.g., program closed), at which point decision 490 branches to the "No" branch, whereupon processing ends at 495.

FIG. 5 is a flowchart showing steps taken in generating viewing area overlays. In FIG. 4, the image generation system identified informational placards depicted in a street view image (steps 425 and 430). FIG. 5 shows steps to generate viewing area overlays for the identified informational placards and their corresponding video devices.

Processing commences at 500, wherein the image generation system selects a first informational placard depicted in the street view image (step 510). At step 520, the image generation system locates a video device depicted in street view image that corresponds to the informational placard (e.g., in proximity to the informational placard). The image generation system analyzes the depicted video device, and determines whether the video device has corresponding viewing boundary indicators (decision 530). For example, the video device may have two physical arrows attached that indicate the viewing angle of the video device (see FIG. 2 and corresponding text for further details). In another embodiment, the video device may have one physical arrow attached to the video device that indicates the center of video device's real-time viewable area.

If the street view image depicts viewing boundary indicators, decision 530 branches to the "Yes" branch, whereupon the image generation system calculates viewing boundary parameters based upon the view boundary indicators. In an embodiment when the video device has one viewing boundary indicator oriented towards the center of the video device's viewing area, the image generation system may compute a pre-defined angle on both sides of the single viewing boundary indicator.

On the other hand, of the street view image does not depict viewing boundary indicators, decision 530 branches to the "No" branch. At step 545, the image generation system generates viewing boundary parameters based upon, for example, a default viewing angle preference, information obtained from the informational placard, or accessing the video device's website/network location and retrieving viewing boundary information.

At step 550, the image generation system generates viewing area overlay information based upon the viewing boundary parameters (from step 540 or step 545), and stores the viewing area overlay information in overlay store 135. In one embodiment, the view area overlay information may identify pixels on the street view image for which to shade a particular color. A determination is made as to whether there are more informational placards depicted in the street view image for which to evaluate (decision 560). If there are more placards to evaluate, decision 560 branches to the "Yes" branch, which loops back to select and evaluate the next informational placard. This looping continues until there are no more informational placards to evaluate, at which point decision 560 branches to the "No" branch.

At step 570, the image generation system combines the viewing area overlay information included in overlay store 135 with the street view image to generate a composite image. Processing returns at 580.

Figure 6:
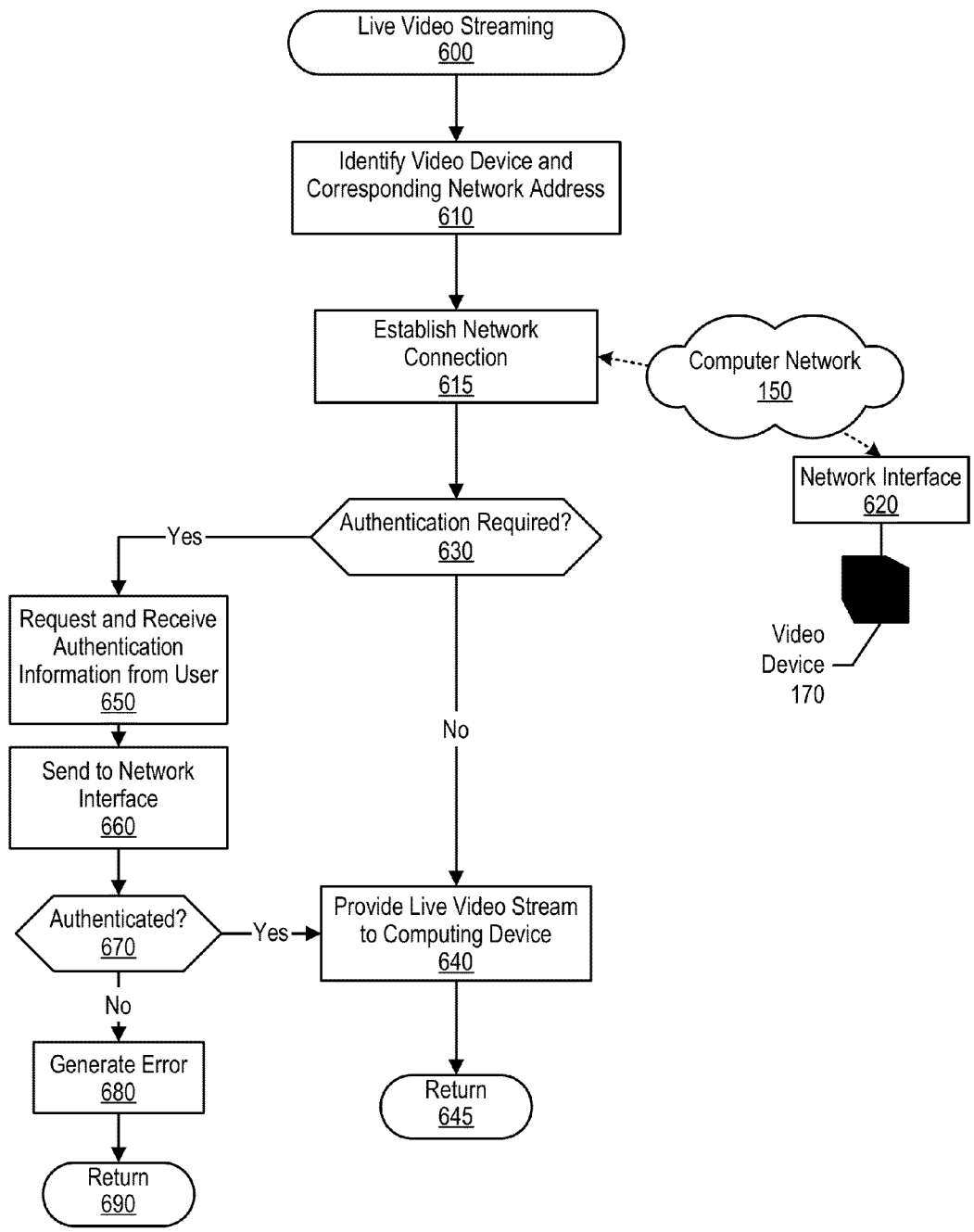
FIG. 6 is a flowchart showing steps taken in providing a live video stream of a real-time viewable area in response to receiving a viewing area selection.

FIG. 6 is a flowchart showing steps taken in providing a live video stream of a real-time viewable area in response to receiving a viewing area selection. In FIG. 4, the image generation system provided a composite view to computing device 155 and received a viewing area selection, which selected one of the viewing area overlays included in the composite image. FIG. 6 shows steps in processing the viewing area selection and providing a live video stream to computing device 155.

Processing commences at 600, whereupon the image generation system identifies a network address of the video device that corresponds to the selected viewing area overlay (step 610). In one embodiment, the image generation system obtains the information from the informational placard depicted in the street view image. At step 615, the image generation system establishes a network connection with video device 170 via network interface 620 through computer network 150. In one embodiment, network interface 620 may be an electronic device coupled to video device 170, such as a computer or network interface card.

A determination is made as to whether the network connection requires authentication (decision 630). For example, the video device may be owned by a government entity or private security company that allows limited access to the video device's live video stream. If authentication is not required, decision 630 branches to the "No" branch, whereupon the image generation system provides a live video stream from video device 170 to computing device 155 and returns at 645.

On the other hand, if authentication is required, decision 630 branches to the "Yes" branch, whereupon the image generation system requests and receives authentication information from a user via computing device 155 (step 650). The image generation system sends the authentication information to network interface 620 at step 660, and a determination is made as to whether the user is authenticated (decision 670).

If the user is authenticated, decision 670 branches to the "Yes" branch, whereupon the image generation system provides a live video stream from video device 170 to computing device 155 and returns at 645. On the other hand, if the user is not authenticated, decision 670 branches to the "No" branch, whereupon the image generation system sends an error to computing device 155 (step 680) and processing returns at 690.

Figure 7:
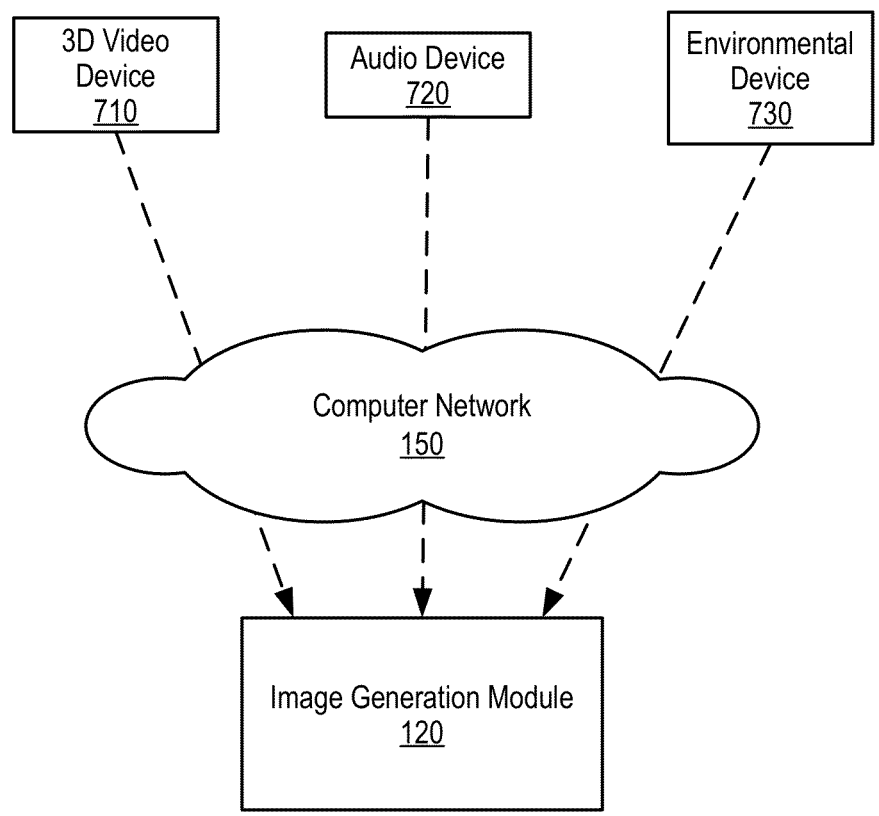
FIG. 7 depicts an image generation system accessing different types of resources to provide real-time information to a computing system.

FIG. 7 depicts an image generation system accessing different types of resources to provide real-time information to a computing system. Image generation system 120 may identify informational placards in a street view image that correspond to different types of sensory devices in addition to the video devices previously discussed.

In one embodiment, image generation system 120 may identify an informational placard corresponding to 3D video device 710. 3D video device 710 may include two camera lenses and produce a three dimensional live video stream. In this embodiment, image generation system 120 generates a viewing area overlay corresponding to 3D video device and combines the viewing area overlay with the street view image (e.g., viewing area overlay 830 shown in FIG. 8). Continuing with this embodiment, a user may provide image generation system 120 with a viewing area selection that selects the viewing area overlay and, in turn, image generation system 120 establishes a network connection with 3D video device 710 through computer network 150 and provides a three dimensional live video stream to computing device 155 accordingly.

In another embodiment, image generation system 120 may identify an informational placard corresponding to audio device 720, such as a microphone, which provides a live audio stream. In this embodiment, image generation system 120 generates an audio overlay and combines the audio overlay with the street view image (audio overlay 870 shown in FIG. 8). Continuing with this embodiment, a user may provide image generation system 120 with an audio selection that selects the audio overlay and, in turn, image generation system 120 establishes a network connection with audio device 720 through computer network 150 and provides a live audio stream to computing device 155 accordingly.

In yet another embodiment, image generation system 120 may identify an informational placard corresponding to environmental device 730, such as a rain gauge or thermometer, which provides real-time environmental data. In this embodiment, image generation system 120 generates an environmental overlay and combines the environmental overlay with the street view image (environmental overlay 855 shown in FIG. 8). In this embodiment, a user may provide image generation system 120 with an environmental selection that selects the environmental overlay and, in turn, image generation system 120 establishes a network connection with environmental device 720 through computer network 150 and provides real-time environmental data to computing device 155 accordingly.

Figure 8:
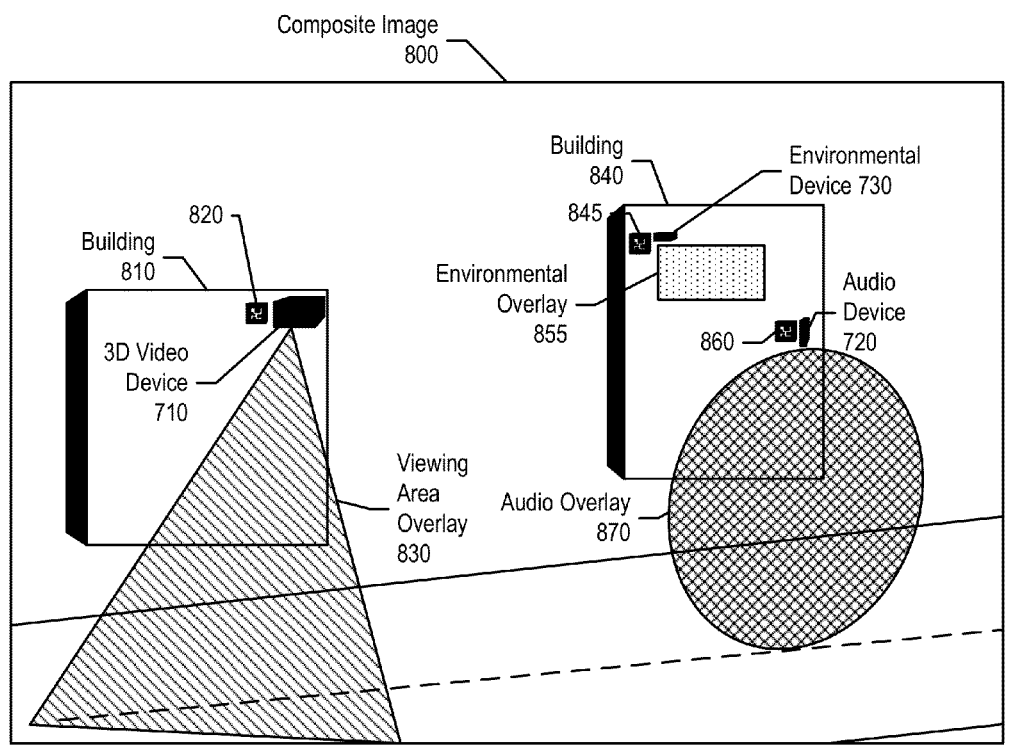
FIG. 8 depicts a composite image that combines different selectable overlay types onto a street view image.

FIG. 8 depicts a composite image that combines different selectable overlay types onto a street view image. In an embodiment that provides different overlay types (e.g., video, audio, environmental), the image generation system may distinguish the different overlays with different types of color and/or shading.

Composite image 800 includes three informational placards, which are placard 820, 845, and 860. Image generation system 120 identifies informational placard 820 on building 810, which identifies corresponding 3D video device 710. In turn, image generation system 120 generates viewing area overlay 830 according to the steps described herein.

Image generation system 120 also identifies informational placard 845 on building 840, which identifies environmental device 730. In turn, image generation system 120 generates environmental overlay 855 that may be, for example, a predefined size that is large enough for a user to view and select.

Image generation system 120 also identifies informational placard 860 on building 840, which identifies audio device 730. In turn, image generation system 120 generates audio overlay 870. In one embodiment, informational placard 860 may include an audible range of audio device 720 (e.g., 50 feet), which image generation device 120 utilizes to determine the size of audio overlay 870. As can be seen, overlays 830, 855, and 870 are shaded differently based upon the type of their corresponding devices.

Figure 9:
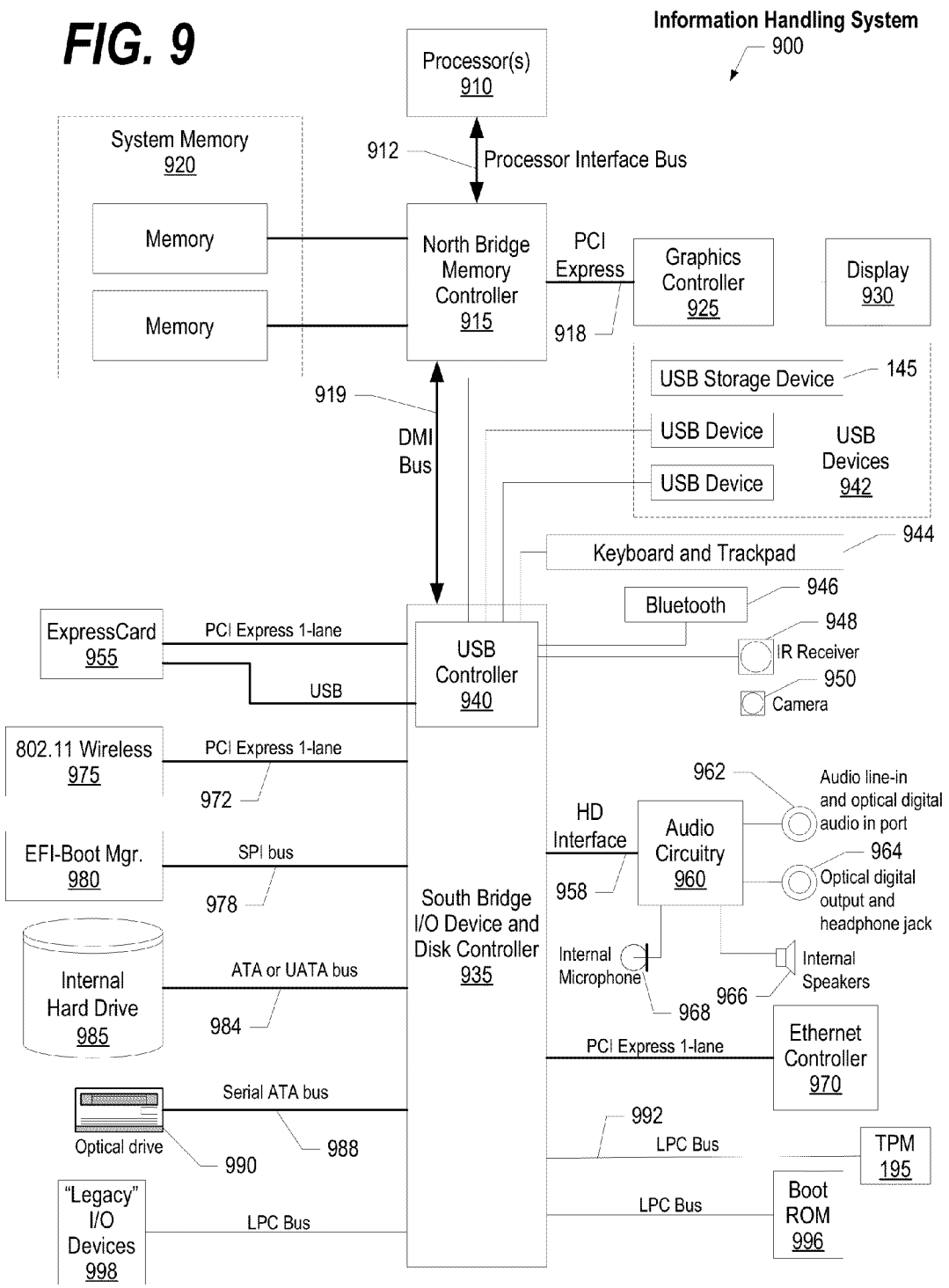
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
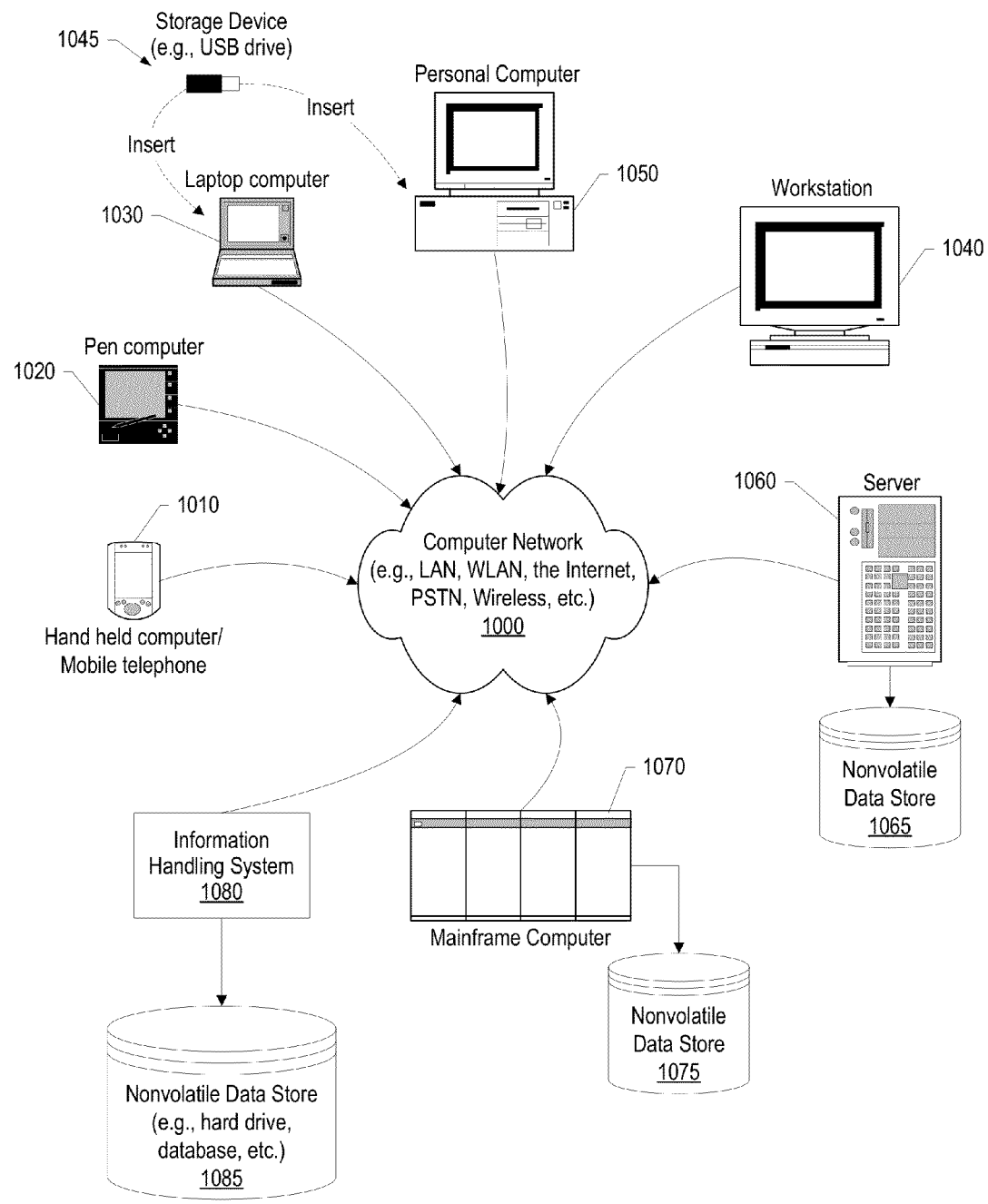
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    retrieving a street view image that depicts a geographical area viewed from a street view perspective;
    identifying an information placard depicted in the street view image corresponding to a video device that provides a live video stream of a real-time viewable area corresponding to at least a portion of the depicted geographical area; and
    generating a composite image that combines the street view image with a viewing area overlay corresponding to the real-time viewable area.

2. The method of claim 1 further comprising:
    receiving a viewing area selection from a computing device that selects the viewing area overlay; and
    providing the live video stream of the real-time viewable area to the computing device in response to receiving the viewing area selection.

3. The method of claim 2 further comprising:
    determining a network address corresponding to the video device based upon information included on the informational placard;
    establishing a network connection with the video device based upon the network address; and
    receiving the live video stream from the video device over the established network connection.

4. The method of claim 1 further comprising:
    identifying one or more viewing boundary indicators included in the street view image that correspond to one or more boundaries of the real-time viewable area;
    generating one or more viewing boundary parameters based upon the one or more viewing boundary indicators; and
    generating the viewing area overlay based upon the one or more viewing boundary parameters.

5. The method of claim 4 wherein, in response to determining that the street view image fails to include the one or more viewing boundary indicators, the method further comprising:
    generating the viewing boundary parameters based upon information retrieved from an informational placard depicted in the street view image; and
    generating the viewing area overlay based upon the viewing boundary parameters.

6. The method of claim 1 further comprising:
    wherein the informational placard corresponds to an audio device that provides a live audio stream corresponding to the geographical area;
    including an audio overlay in the composite image, wherein at least a portion of the audio overlay is positioned in proximity to the informational placard;
    receiving an audio selection that selects the audio overlay; and
    providing the live audio stream in response to receiving the audio selection.

7. The method of claim 1 further comprising:
    wherein the informational placard corresponds to an environmental device that provides real-time environmental data corresponding to the geographical area;

including an environmental overlay in the composite image, wherein at least a portion of the environmental overlay is positioned in proximity to the informational placard;

receiving an environmental selection that selects the environmental overlay; and providing the real-time environmental data in response to receiving the environmental selection.

* * * * *